(12) United States Patent
Rocca

(10) Patent No.: US 7,021,548 B1
(45) Date of Patent: Apr. 4, 2006

(54) PHOTOSENSOR COVER AND KIT

(76) Inventor: Jason A. Rocca, 6 Althea Cir., Agawam, MA (US) 01001

( * ) Notice: Subject to any disclaimer, the term of this patent is extended or adjusted under 35 U.S.C. 154(b) by 0 days.

(21) Appl. No.: 10/906,208

(22) Filed: Feb. 9, 2005

(51) Int. Cl.
*G06K 7/10* (2006.01)

(52) U.S. Cl. .............................. 235/472.01; 235/462.46

(58) Field of Classification Search ........... 235/472.01, 235/462.46, 462.01; 702/117
See application file for complete search history.

(56) References Cited

U.S. PATENT DOCUMENTS

| | | | |
|---|---|---|---|
| 4,154,344 A | | 5/1979 | Yenni, Jr. et al. |
| 4,334,752 A | * | 6/1982 | Johnson et al. ............. 396/535 |
| 4,454,568 A | | 6/1984 | Stadnik |
| 4,573,578 A | | 3/1986 | Greminger, Jr. et al. |
| D302,170 S | | 7/1989 | Harrison |
| 4,985,721 A | | 1/1991 | Moon |
| 5,294,945 A | * | 3/1994 | Omura et al. ................ 347/247 |
| 5,372,429 A | | 12/1994 | Beaver, Jr. et al. |
| D354,644 S | | 1/1995 | Robinson |
| 5,395,681 A | | 3/1995 | Hargarter et al. |
| 5,743,458 A | | 4/1998 | French |
| 5,806,983 A | | 9/1998 | Millon et al. |
| 5,884,766 A | | 3/1999 | Marou |
| 5,973,768 A | | 10/1999 | Mazion et al. |
| 6,007,245 A | | 12/1999 | Looy |
| 6,024,625 A | * | 2/2000 | Pearce .......................... 446/81 |
| 6,613,036 B1 | | 9/2003 | Farmer et al. |
| 6,827,214 B1 | | 12/2004 | Alzner et al. |
| 2002/0023960 A1 | * | 2/2002 | Knowles et al. ........ 235/472.01 |
| 2004/0022152 A1 | * | 2/2004 | Hayashi ...................... 369/53.2 |
| 2005/0055172 A1 | * | 3/2005 | Flaherty ...................... 702/117 |

* cited by examiner

*Primary Examiner*—Thien M. Le
*Assistant Examiner*—Thien Mai
(74) *Attorney, Agent, or Firm*—Doherty, Wallace, Pillsbury & Murphy, P.C.; Deborah A. Basile

(57) ABSTRACT

A photosensor cover and kit for detecting a malfunction in a lighting system, wherein the lighting system comprises an illuminator and a photosensor. The photosensor comprises a photocell that detects a threshold amount of light and electronic circuitry in communication with the photocell that signals the illuminator to turn on/off when the threshold amount of light has been detected by the photocell. The photosensor cover comprises a cap comprising: a barrier layer comprising an opening, wherein the barrier layer is disposed over the housing body such that the barrier layer covers the photocell. The photosensor cover further comprises an adjustment element that allows for the expansion or contraction of the opening, and wherein the adjustment element assists in preventing the threshold amount of light from reaching the photocell.

14 Claims, 4 Drawing Sheets

PHOTOSENSOR COVER AND KIT

BACKGROUND OF THE INVENTION

1. Field of the Invention

The present invention relates to a device for detecting a malfunction of a lighting system. More particularly, the present invention relates to a photosensor cover placed over a photosensor of a malfunctioning lighting system to determine whether the source of malfunction of the lighting system lies in the illuminator or in the photosensor of the lighting system.

2. Background of the Invention

A photosensor is an electronic control unit that automatically adjusts the output level of an illuminator(s), e.g., an electric light source, based on the amount of ultraviolet, infrared, or visible light (hereinafter collectively referred to as "light") detected by the photosensor. In general, photosensors comprise a light sensitive photocell that detects the light; input optics; electronic circuitry that converts the photocell signal to an output control signal; and a housing body for holding the photosensor's components.

Photosensors may operate either by an open-loop system or a closed-loop system. In an open-loop system, the amount of light emitted from an illuminator is determined from a daylight signal, e.g., from sunlight, received by the photocell. Once the daylight reaches a predetermined level, i.e., the threshold amount of light, the photosensor signals the illuminator to turn off. Where the lighting system further comprises a dimming component, a signal proportional to the outside daylight instructs the dimming component to dim the illuminator by an amount proportional to the amount of available daylight sensed by the photosensor.

In a closed-loop system, negative feedback is used to respond to both changing amounts of, for example, sunlight and electric light detected by the photocell. In the negative feedback system, an increase in an input signal level causes a decrease in the output signal; conversely, a decrease in input signal causes an increase in output signal. Accordingly, the more light that is detected by the photosensor, the less luminescence will be emitted by the illuminator; conversely, the less light that is detected by the photosensor, the more luminescence will be emitted by the illuminator.

Oftentimes, when a lighting system comprising a photosensor malfunctions, it is difficult to know whether the source of the malfunction lies in the illuminator or in the photosensor. In order to determine the source of the malfunction during daylight hours, the photosensor must be guarded from the light. That is, if light is blocked from reaching the photosensor, and the illuminator turns on, then the photosensor likely is working and the problem likely lies with the illuminator. Conversely, if light is blocked from reaching the photosensor, and the illuminator does not turn on, then the defect likely lies with the illuminator and/or the photosensor.

Currently, to determine the source of the lighting system's malfunction, practitioners place a dark adhesive tape or a hand glove or mitten over the photosensor to block the light from reaching the photocell. However, such materials have proven problematic. That is, it takes a considerable amount of time to apply and remove the adhesive tape to the photosensor. Additionally such application and removal runs the risk of damaging the photosensor, and the tape is not capable of withstanding the various climatic conditions to which the photosensor may be exposed. Furthermore, it is oftentimes difficult to judge how much tape is necessary to effectively guard the photocell from exposure to the threshold amount of light. With regards to the hand apparel, such materials are unsatisfactory in that they do not adequately conform to the shape of the photosensor, thereby making them inefficient in blocking out the light. Additionally, light is able to reach the photocell by passing through the material of the glove, as well as, up/down and through the opening of the glove. Also, the hand apparel of the prior art is not sufficiently weather resistant to sustain its integrity in the various climatic conditions to which the photosensor may be exposed. Also, a single glove cannot be used to cover a variety of sizes and configurations of photosensors. Accordingly, the prior art has proven inefficient and ineffective in adequately blocking the photocell from exposure to light; thereby, making the determination of the source of the lighting system's malfunction difficult.

Therefore, what is needed is a device capable of adequately shielding the photosensor from light, wherein such device will conform to a variety of sized and configured photosensors, will withstand a variety of climatic conditions, will be readily available to a practitioner, will be easily applied and removed from the photosensor, and will not harm the photosensor.

SUMMARY OF THE INVENTION

The above discussed and other drawbacks and deficiencies of the prior art are overcome or alleviated by a photosensor cover for detecting a malfunction in a lighting system. The lighting system comprises an illuminator and a photosensor. The photosensor comprises a photocell that detects a threshold amount of light; electronic circuitry in communication with the photocell that signals the illuminator to turn on/off when the threshold amount of light has been detected by the photocell; and a housing body which holds the photocell and the electronic circuitry. The photosensor cover comprises a cap comprising: a barrier layer comprising an opening, wherein the barrier layer is disposed over the housing body such that the barrier layer covers the photocell. The photosensor cover further comprises an adjustment element that allows for the expansion or contraction of the opening, and wherein the adjustment element assists in preventing the threshold amount of light from reaching the photocell.

DETAILED DESCRIPTION OF THE INVENTION

The present invention is a photosensor cover useful in detecting the source of malfunction in a lighting system, wherein the lighting system comprises a photosensor and an illuminator. The photosensor may be any conventionally known photosensor that signals an illuminator to control its luminescent output. Such a photosensor typically comprises a photocell, input optics, electronic circuitry, and a housing body. Therefore, the photosensor may comprise any currently known photosensor, and includes without limitation, those photosensors found in association with streetlights, stadium and arena floodlights, parking lot lights, photosensitive lights found outside and inside residential dwellings, such as are found on lawns and attached to homes, apartment complexes, condominiums, and/or garages as well as on, around, or in commercial properties. The illuminator may comprise any device that transmits luminescence, and may include, for example, an electric light.

The photosensor cover of the present invention comprises a cap in communication with an adjustment element. By means of a cavity formed in the cap, the cap can be fitted over a photosensor such that the photosensor's photocell is guarded from exposure to a threshold amount of light that would otherwise activate the photocell to transmit signals to the illuminator. Additionally or alternatively, an overlay may be temporarily or permanently positioned directly or indirectly onto the photocell to guard the photocell from the threshold amount of light.

The adjustment element of the photosensor cover assists the cap in fitting over a variety of sized and configured photosensors. That is, the adjustment element comprises means whereby the overall size of the cap may be expanded or contracted to suit the dimensions of a particular photosensor. Additionally, the adjustment element may be used to tighten the cap onto the photosensor thereby eliminating any holes or gaps between the contact points of the photosensor and the photosensor cap, wherein such holes/gaps allow the threshold amount of light to reach the photocell.

The invention will now be described with reference to the Figures. However, in no way shall the Figures be seen as limiting, as modifications and alterations of the device, as would occur to a person of ordinary skill in the art, are contemplated herein.

Figure 1:
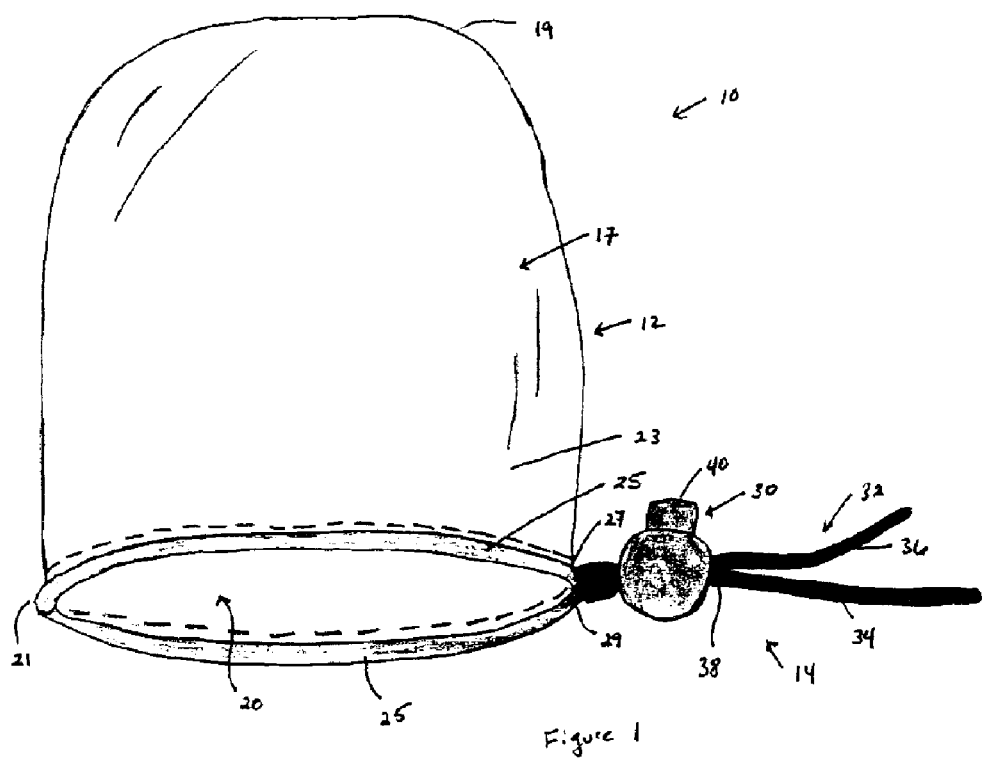
FIG. 1 is a schematic illustrating an elevational outer side view of an exemplary photosensor cover.
Figure 2:
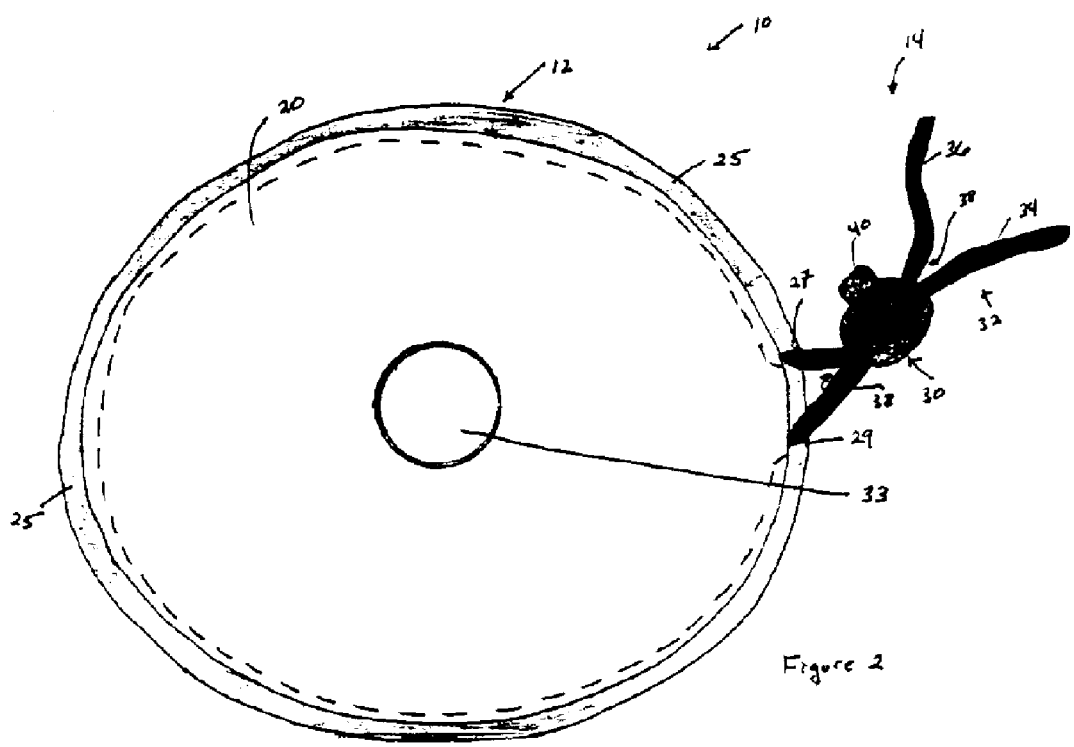
FIG. 2 is a schematic illustrating an aerial view of a bottom side of the photosensor cover depicted in FIG. 1.

Referring to FIGS. 1 and 2, an exemplary photosensor cover 10 comprises a cap 12 and an adjustment element 14. Cap 12 comprises a barrier layer 17. Barrier layer 17 serves several functions. Among these, barrier layer 17 blocks the threshold amount of light from reaching the photosensor's photocell. Accordingly, barrier layer 17 preferably comprises a material that has a sufficient thickness and opacity to shield the photosensor from the threshold amount of light. Additionally, barrier layer 17 confers flexibility and malleability to cap 12 such that cap 12 can be fitted over a wide size and configuration range covering a wide variety of photosensors. Furthermore, barrier layer 17 is preferably weather-resistant such that cap 12 can withstand use in a variety of climates and weather conditions. In an exemplary embodiment, barrier layer 17 comprises leather, vinyl, canvas, and the like, wherein a blackened vinyl is especially preferred.

Still referring to FIGS. 1 and 2, barrier layer 17 comprises a top side 19 opposite to a bottom side 21 and side walls 23 that join top side 19 to bottom side 21. Bottom side 21 comprises a rim 25 that borders an opening, wherein the opening leads into a cavity 20 that provides access to an interior portion of cap 12. Rim 25 comprises a slit 27 and a slit 29 that lead into an internal channel formed in rim 25. As will be explained in further detail below, the internal channel is preferably compatible for use with adjustment element 14.

Figure 3:
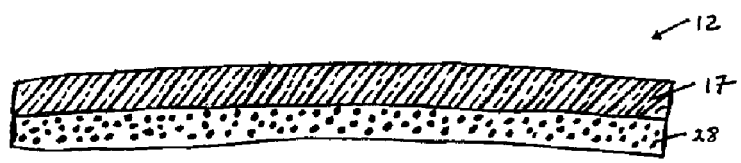
FIG. 3 is a schematic illustrating a cross-sectional view of exemplary layers of an exemplary multi-layered photosensor cover.

Referring to FIG. 3, cap 12 may be multi-layered such that, for example, in addition to barrier layer 17, cap 12 may further comprise one or more of a protective layer 28, wherein protective layer 28 preferably terminates at or below rim 25 such that it does not block photosensor cover 10's opening. In an exemplary embodiment, protective layer 28 is disposed on the interior portions of top side 19, bottom side 21, and side walls 23 of barrier layer 17. Furthermore, like barrier layer 17, protective layer 28 also preferably comprises a flexible and malleable material such that the photosensor cover can conform to the configuration of a variety of photosensors. Additionally, protective layer 28 also preferably comprises a material of sufficient softness and non-abrasiveness to reduce the likelihood that the photosensor cover will scratch or otherwise damage the photosensor, wherein an exemplary material comprises cotton, felt, down, and the like.

Again referring to FIGS. 1 and 2, exemplary adjustment element 14 of cap 12 comprises an adjustor 30 attached to a drawstring 32. Drawstring 32 comprises a first terminal end 34 opposite to a second terminal end 36. First terminal end 34 is inserted through slit 27 and maneuvered through rim 25's channel until first terminal end 34 protrudes from slit 29 and second terminal end protrudes from slit 27. First and second terminal ends 34 and 36 are then inserted through a hole 38 located on adjustor 30. Adjustor 30, which, as shown in the Figures, comprises a push button mechanism operated by a spring, is known in the art. To release drawstring 32 from the grip of adjustor 30, a button 40 is compressed. Once button 40 is released, drawstring 32 is again gripped by adjustor 30. Therefore, by pushing and releasing button 40, the position of adjustor 30 along drawstring 32 may be altered. Although not specifically depicted, another exemplary adjustment element may comprise an elastic band, wherein the elastic band may be inserted through the channel of rim 25. Like adjustor 30 described in the figures, the elastic band assists in reducing any gaps that may otherwise form between the bottom side of the cap and the photosensor as the elastic band preferably assists in flexing the bottom side of the cap such that the bottom side expands to fit on the cap and then contracts to shield out the threshold amount of light.

Figure 5:
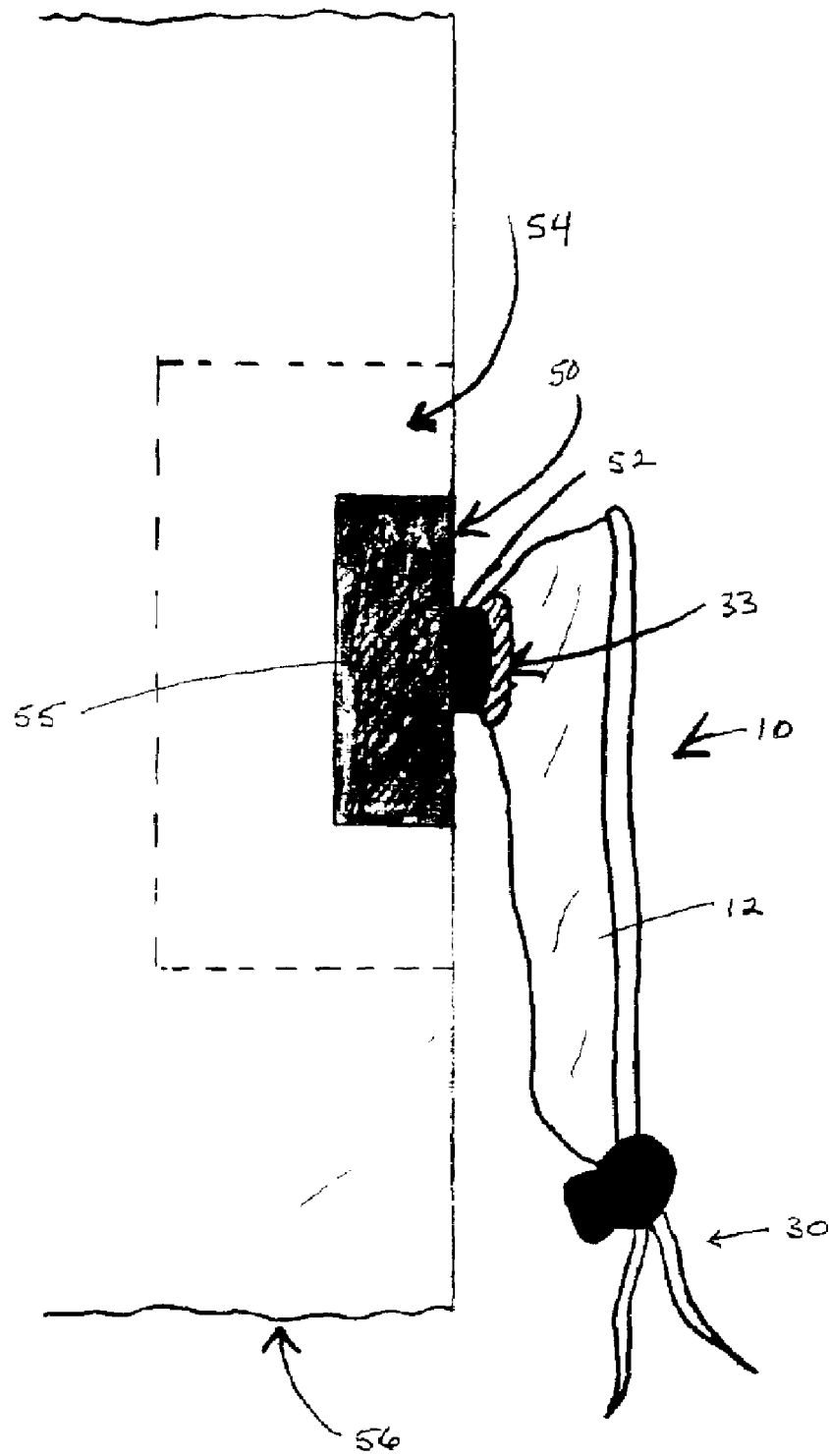
FIG. 5 is a schematic illustrating another exemplary application of an exemplary photosensor cover.

Referring to FIGS. 2 and 5, cap 12 may further comprise an overlay 33. Overlay 33 is configured and dimensioned to fit over the photocell and to remain detachably secured thereto. As such, it may be positioned anywhere on cap 12. Although overlay 33 may be snapped, twisted, screwed, or otherwise fastened to the photocell, in an exemplary embodiment, overlay 33 comprises a snap mechanism such that overlay 33 snaps over the photocell. Therefore, in addition to or alternatively to barrier layer 17 and adjustable element 14, overlay 33 further shields photocell 44 from the threshold amount of light.

An exemplary application of photosensor cover 10 is to determine whether a malfunction in a lighting system is attributed to a defect with the photosensor or with the illuminator. By shielding the photocell of the photosensor with the photosensor cover disclosed herein, the threshold amount of light may be blocked from the photocell's detection. Upon normal operation, once the threshold amount of light is blocked, the photosensor signals the illuminator to turn on. Therefore, if the photosensor cover is applied to block the threshold amount of light, and the illuminator does not turn on, either the photosensor and/or the illuminator likely has a defect. However, if the photosensor cover is applied to block the threshold amount of light from the photocell's detection and the illuminator does turn on, then the defect likely lies, not with the photosensor, but with the illuminator. Accordingly, in order to identify the source of the illuminating system's malfunction, it is of paramount importance that the photosensor cover be disposed over the photosensor such that the threshold amount of light is absolutely blocked from reaching the photocell.

Figure 4:
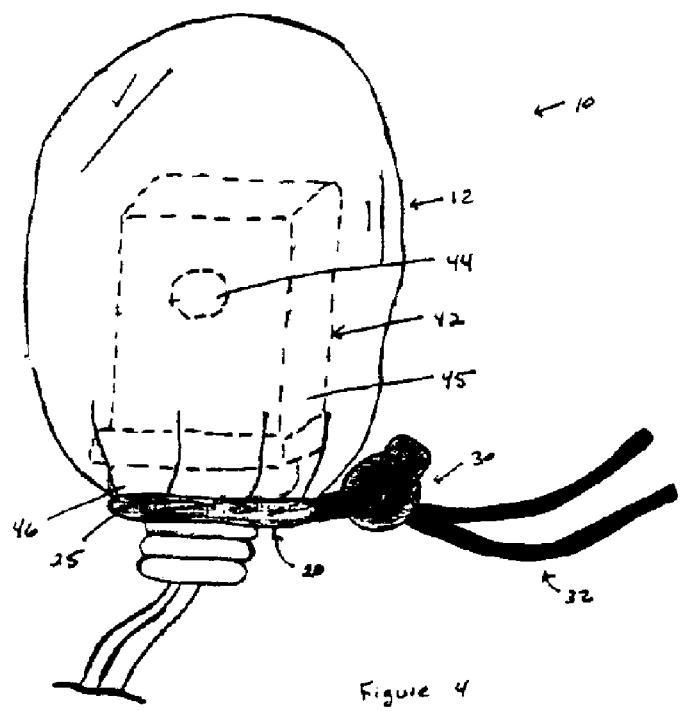
FIG. 4 is a schematic illustrating an exemplary application of an exemplary photosensor cover.

FIG. 4 depicts an exemplary application of photosensor cover 10 over an exemplary photosensor 42 such that the threshold amount of light does not reach the photocell. Referring to FIG. 4, photosensor 42 comprises a photocell 44 surrounded by a housing body 45. Cap 12 is disposed over housing body 45 such that housing body 45 fits within cavity 20 and rim 25 fits over a base 46 of photosensor 42.

To ensure that the threshold amount of light does not enter through cavity 20, adjustor 30 is manipulated such that rim 25 closes tightly around base 46 of photosensor 42. Such manipulation entails loosening adjustor 30 and sliding it along drawstring 32 such that an appropriate amount of drawstring 32 is allotted for the expansion or contraction of rim 25. Once rim 25 covers base 46, adjustor 30 may be moved closer to rim 25 thereby tightening cap 12 over photosensor 42.

Referring to FIG. 5, in an alternate embodiment, where only overlay 33 is used to guard the photocell from the threshold amount of light, an exemplary photosensor 50 comprises a photocell 52 projecting from a housing 55, wherein photosensor 50 is situated within an electrical box 54 within a side wall of a building 56. Photosensor cover 10 comprises cap 12 and adjustor 30. Overlay 33 of cap 12 fits onto photocell 52 thereby blocking the threshold amount of light from reaching photosensor 50. It is further contemplated that overlay 33 will be employed in combination with cap 12 such that both overlay 33 and cap 12 guard photocell 52 from exposure to the threshold amount of light.

Figure 6:
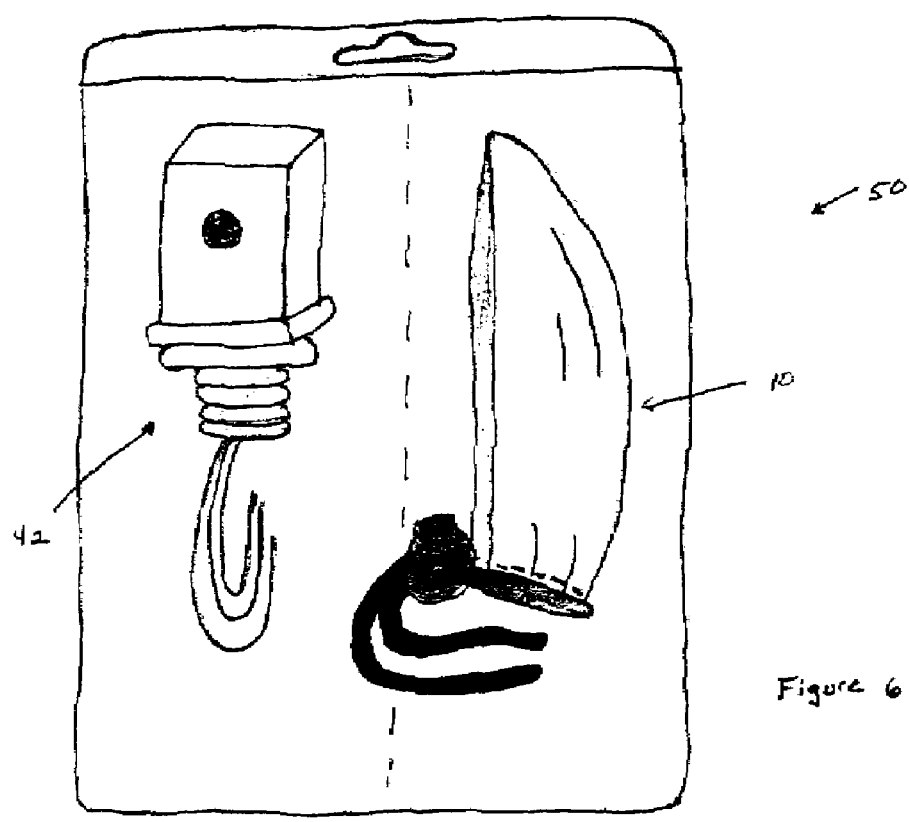
FIG. 6 is a schematic depicting an exemplary kit comprising a photosensor cover and a photosensor.

Referring to FIG. 6, it is contemplated herein that photosensor cover 10 as disclosed herein is ideally suited for use in a kit 50, wherein kit 50 comprises photosensor cover 10 and photosensor 42. In this manner, a practitioner will have readily available a tool for detecting the source of any future potential problems with a lighting system comprising a photosensor.

Based on the above disclosure, the photosensor cover contemplated herein has many advantages over the prior art. First, a single photosensor cover can be utilized to fit over a wide number of sized and dimensioned photosensors. Second, unlike the prior art, the photosensor cover's combined working of the barrier layer and adjustment element is able to guard against the threshold amount of light from reaching the photocell. Third, the photosensor cover is easily disposed over and removed from the photosensor. Fourth, the photosensor cover of the present invention eliminates the problem of guessing how much adhesive tape needs to be applied to the photosensor to block the photocell from the threshold amount of light. Therefore, there is no guesswork involved in using the photosensor cover disclosed herein. Therefore, by using the photosensor disclosed herein in association with a malfunctioning lighting system, a practitioner can determine the source of the lighting system's defect with ease and clarity.

While preferred embodiments have been shown and described, various modifications and substitutions may be made thereto without departing from the spirit and scope of the invention. Accordingly, it is to be understood that the present invention has been described by way of illustrations and not by limitation. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A photosensor cover for detecting a malfunction in a lighting system, wherein the lighting system comprises:
    an illuminator; and
    a photosensor comprising:
        a photocell that detects a threshold amount of light;
        electronic circuitry in communication with the photocell that signals the illuminator to turn on/off when the threshold amount of light has been detected by the photocell; and
        a housing body that holds the photocell and the electronic circuitry;
    wherein the photosensor cover comprises:
        a cap comprising:
            a barrier layer comprising an opening that leads into a cavity, wherein the barrier layer guards the photocell from the threshold amount of light, and wherein the barrier layer further comprises a bottom side opposite to a top side and side walls that connect the bottom side to the top side, wherein the bottom side comprises a rim that surrounds the opening that leads into the cavity, wherein the rim comprises an internal channel; and
            an adjustment element, wherein the adjustment element allows for the expansion or contraction of the opening, and wherein the adjustment element assists the barrier layer in guarding the photocell from exposure to the threshold amount of light.

2. The photosensor cover of claim 1, wherein a portion or the housing body holding the photocell is fitted into the cavity of the photosensor cover such that the photocell is covered by the photosensor cover.

3. The photosensor cover of claim 2, wherein the photosensor cover further comprises an overlay that protrudes from the barrier layer, wherein the overlay is engaged with the photocell to further protect the photocell from exposure to the threshold amount of light.

4. The photosensor cover of claim 3, wherein the overlay snaps onto the photocell.

5. The photosensor cover of claim 1, wherein the adjustment element comprises an elastic band disposed in the internal channel.

6. The photosensor cover of claim 1, wherein:
    the rim further comprises a first slit and a second slit, and wherein access to the internal channel is provided by the first and second slits; and
    the adjustment element comprises:
        a drawstring having a first terminal end opposite to a second terminal end, wherein the drawstring is inserted through the internal channel of the rim such that the first terminal end protrudes outwardly through the first slit and the second terminal end protrudes outwardly through the second slit; and
        an adjustor slidably engaged with the drawstring.

7. The photosensor cover of claim 1, wherein the photosensor cover further comprises a protective layer disposed between the barrier layer and the cavity.

8. The photosensor cover of claim 1, wherein the photosensor cover further comprises an overlay that protrudes from the barrier layer, wherein the overlay is engaged with the photocell to protect the photocell from exposure to the threshold amount of light.

9. The photosensor cover of claim 8, wherein the overlay snaps onto the photocell.

10. A kit comprising:
a photosensor comprising a photocell and a housing body, wherein the photocell is held by the housing body; and
a photosensor cover comprising:
   a cap comprising:
      a barrier layer comprising an opening that leads into a cavity, wherein the barrier layer further comprises a bottom side opposite to a top side and side walls that connect the bottom side to the top side, wherein the bottom side comprises a rim that surrounds the opening that leads into the cavity, wherein the rim comprises an internal channel; and
   an adjustment element attached to the cap, wherein the adjustment element assists in the expansion and contraction of the opening;
wherein the kit assists in detecting a malfunction with a lighting system, wherein the lighting system comprises an illuminator controlled by the photosensor.

11. The kit of claim 10, wherein the adjustment element comprises an elastic band disposed in the internal channel.

12. The kit of claim 10, wherein:
the rim further comprises a first slit and a second slit, and wherein access to the internal channel is provided by the first and second slits; and
the adjustment element comprises:
   a drawstring having a first terminal end opposite to a second terminal end, wherein the drawstring is inserted through the internal channel of the rim such that the first terminal end protrudes outwardly through the first slit and the second terminal end protrudes outwardly through the second slit; and
   an adjustor slidably engaged with the drawstring.

13. The kit of claim 10, wherein the photosensor cover further comprises a protective layer disposed between the barrier layer and the cavity.

14. The kit of claim 10, wherein the photosensor cover further comprises an overlay that protrudes from at least one of the barrier layer and the protective layer into the cavity.

* * * * *